March 28, 1961  W. JONES  2,977,489
AIR COOLED ROTOR STRUCTURE FOR DYNAMO ELECTRIC MACHINES
Filed Aug. 5, 1958
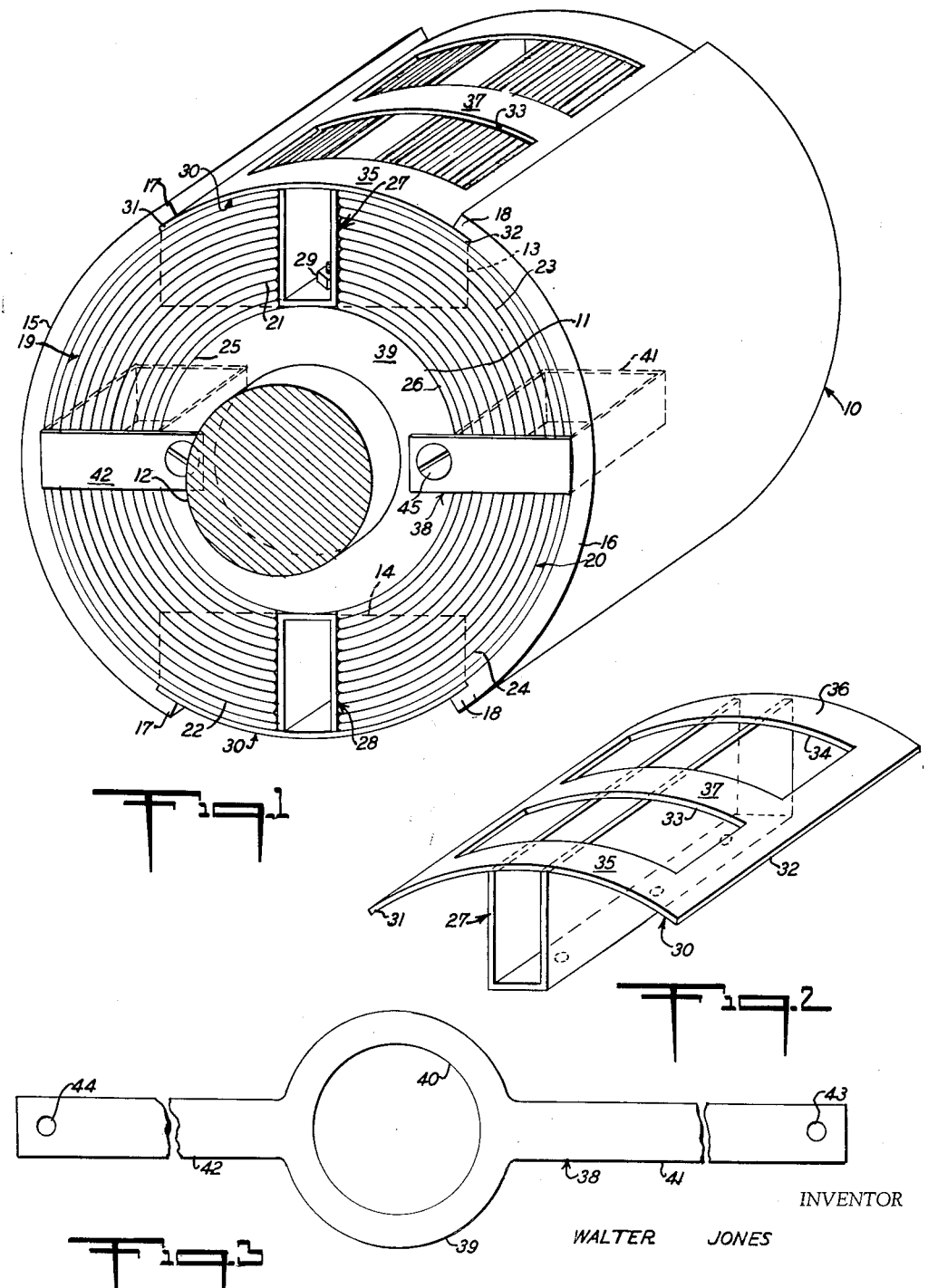
INVENTOR
WALTER JONES
BY Jacobi + Jacobi
ATTORNEYS

United States Patent Office 2,977,489
Patented Mar. 28, 1961

2,977,489

AIR COOLED ROTOR STRUCTURE FOR DYNAMO ELECTRIC MACHINES

Walter Jones, 982 River Road, Edgewater, N.J.

Filed Aug. 5, 1958, Ser. No. 753,276

4 Claims. (Cl. 310—61)

This invention relates to electricity and more particularly to a rotor structure for dynamo electric machines, particularly designed to facilitate dissipation of the heat generated during operation of such machines.

Heretofore attempts have been made to cool the rotor structures of dynamo electric machines by providing fans on the rotor shaft, but such fans operated only to circulate air between the rotor and stator of the machine, since no air passages were provided in the rotor and since the winding substantially filled the slots provided therefor, no circulation of air through the windings was possible. As a result, these rotors tended to overheat, particularly if the machine was subjected to any overload and even though such machines were normally designed with a sufficient mass or area to dissipate the heat generated during normal operation, nevertheless very little if any safety factor was provided to dissipate the heat generated during periods of overload which often resulted in damage to the machines. In the larger dynamo electric machines elaborate cooling apparatus was frequently provided to refrigerate and circulate cooled air through the machine, but obviously, such insulations were relatively costly to install and moreover, the power requirements for operating the same were relatively high. Also these systems were not particularly satisfactory to provide sufficient cooling during periods of overload.

It is accordingly an object of the invention to provide an air cooled rotor structure for dynamo electric machines which utilizes the rotation of the rotor to provide a centrifugal pump action to circulate cooling air through the winding of the rotor. A further object of the invention is the provision of an air cooled rotor structure for dynamo electric machines in which axially disposed cooling air passages are provided in the winding of the rotor to facilitate cooling thereof.

A still further object of the invention is the provision of an air cooled rotor structure for dynamo electric machines in which a substantial portion of the windings are exposed in order to facilitate the passage of cooling air and to effectively cool such windings.

Another object of the invention is the provision of an air cooled rotor structure for dynamo electric machines which eliminates the necessity for providing fan blades on the rotor shaft or for providing an auxiliary cooling system in order to effectively cool such rotor during operation thereof.

A still further object of the invention is the provision of an air cooled rotor structure for dynamo electric machines combined with means for effectively securing the end portions of the windings in place at the opposite ends of the rotor in order to prevent displacement of such winding portions during rotation thereof.

A further object of the invention is the provision of an air cooled rotor structure for dynamo electric machines which may be conveniently and economically constructed from readily available materials without materially adding to the cost of conventional rotor structure.

Further objects and advantages of the invention will be apparent from the following description taken in conjunction with the accompanying drawing wherein:

Fig. 1 is a view in perspective showing an air cooled rotor structure constructed in accordance with this invention, as well as the retaining means for the end portions of the rotor windings;

Fig. 2 a view in perspective showing the channel providing an air passage, as well as the closure plate which serves to retain the winding in place and at the same time, close portions of the channel and expose portions of the winding; and Fig. 3 an elevational view of the winding end portion retaining means.

With continued reference to the drawing, there is shown a rotor 10 for dynamo electric machines, which rotor may be made as a solid casting or machined part or may if desired, be fabricated from a plurality of laminations in accordance with standard practice. The particular structure of the rotor itself forms no part of the present invention and accordingly, a detailed showing or explanation of such structure is not considered desirable or necessary. For purposes of illustration, a two pole rotor is shown, but obviously the invention may be employed with either a two pole rotor or one with any number of poles, as desired.

The rotor 10 is provided with a core 11 which may be mounted on a shaft 12 by any suitable means and the core 11 is provided with a pair of diametrically opposed axially extending outwardly opening grooves 13 and 14, the purpose of which will presently appear. The core 11 is provided on opposite sides with arcuate portions 15 and 16 which terminate in overhanging lips 17 and 18 on opposite edges of the grooves 13 and 14. A pair of windings 19 and 20 of suitable conductive material are disposed in the grooves 13 and 14 with portions 21 and 22 of the winding 19 disposed in a part of the grooves 13 and 14, while portions 23 and 24 of the winding 20 are disposed in other parts of the grooves 13 and 14. The end portions 25 and 26 of the windings 19 and 20 extend across the opposite ends of the rotor 10 to connect the winding portions of the grooves 13 and 14.

Centrally disposed channels 27 and 28 extend throughout the length of each groove 13 and 14 with the channel 27 disposed between the winding portions 21 and 23 and the channel 28 disposed between the winding portions 22 and 24. Each channel opens outwardly and at opposite ends and the channels 27 and 28 may be secured to the core 11 by suitable fastening means 29.

A closure plate 30 is provided for each groove 13 and 14 and as clearly shown in Fig. 1, the side edges 31 and 32 are disposed beneath the lips 17 and 18 in order to secure the plates 30 in place and also to retain the winding portions 21 and 23 as well as the portions 22 and 24 in the grooves 13 and 14.

Each closure plate 30 is provided with axially spaced peripherally extending slots 33 and 34 which operate to provide window exposing portions of the channels 27 and 28 and the windings in the grooves 13 and 14 and it will be noted, that the end portions 35 and 36, as well as the central portion 37 of the closure plates 30 serve to cover the open sides of the channels 27 and 28 to provide axially extending air passages therein. While the closure plates 30 have been shown with two windows or openings 33 and 34, obviously any desired number of such openings may be employed and the number would, of course, vary with the length of the rotor 10.

The end portions 25 and 26 of the windings must be held in place against the action of centrifugal force which tends to displace the same and for this purpose there has been provided a retaining means for such end portions in the form of a strap 38 of metal or other suitable material and as best shown in Fig. 3, such strap is provided with a central circular portion 39 having an opening 40 therein for receiving the shaft 12 and with oppositely extending end portions 41 and 42 which may be provided with apertures 43 and 44 adjacent the outer end thereof.

In use, the winding retaining means shown in Fig. 3 is applied to the rotor 10 with the shaft 12 projecting through the opening 40 in the circular portion 39 and as shown in dotted lines in Fig. 1, the end portions 41 and 42 extend outwardly from the shaft 12 behind the end portions 25 and 26 of the windings with the end portions 41 and 42 of the strap 38 bent around the end portions of the windings and into a position overlying the inner end of straps 38 whereupon the ends 41 and 42 may be secured to the core 11 of the rotor 10 by a suitable fastening means 45 which may extend through the apertures 43 and 44 into the core 11 and consequently it will be seen that the end portions 41 and 42 of the straps 38 operate to securely retain the end portions 25 and 26 of the windings in place against displacement.

In operation, the cooling features of the invention operate by reason of the centrifugal force generated during the rotation of the rotor 10 and as will be seen, air is drawn into the channels 27 and 28 from opposite ends of the rotor 10 and such air will escape through the openings 33 and 34 in the cover plate 30 to cool the windings adjacent the chanels 27 and 28. Also due to the fact that the openings 33 and 34 expose a considerable portion of the windings in the grooves 13 and 14, air will also be drawn through such windings and exhausted through the openings 33 and 34 to provide an additional cooling effect. It has been found that this cooling action is extremely efficient and that the temperature rise in rotors of this type may be maintained at a reasonable value even under conditions of considerable overload. Furthermore, the structure necessary to provide this cooling action is extremely simple and economical to construct and obviously may be utilized on rotors of substantially conventional design and construction without materially increasing the cost thereof. Furthermore, there has been provided a simple economical and efficient means to retain the end portions of the windings in place which will tend to eliminate costly and time consuming lacing operations or other expedients for maintaining these winding end portions against displacement.

It will be obvious to those skilled in the art that various changes may be made in the invention without departing from the spirit and scope thereof and therefore the invention is not limited by that which is shown in the invention and described in the specification, but only as indicated in the appended claims.

What is claimed is:

1. An air cooled rotor structure for dynamo electric machines, said rotor comprising a core, means for mounting said core on a shaft, at least one pair of diametrically opposed, axially extending, outwardly opening grooves in said core, an overhanging lip on each side edge of each groove, at least one pair of windings in each pair of grooves with a portion of each winding disposed in each groove, the opposite end portions of said windings extending across the opposite ends of said rotor to connect the portions in each groove, a centrally disposed channel member extending throughout the length of each groove between said winding portions, each channel member opening outwardly and at opposite ends, a closure plate for each groove, the side edges of each plate being disposed beneath said lips to retain said windings in said grooves and close the outwardly opening sides of said channels to provide axially extending air passages, axially spaced, peripherally extending slots in said plates providing windows to expose portions of said channels and windings to facilitate the flow of air through said channels and windings and retaining means for the opposite end portions of said windings comprising a strap extending diametrically across each end of said rotor between said end portions and said core, each strap having a clearance opening for said shaft, the outer end of each strap being bent inwardly over the opposite end portions of said windings and means for securing the ends of said straps to said core.

2. Said rotor comprising a core, means for mounting said core on a shaft, at least one pair of diametrically opposed, axially extending, outwardly opening grooves in said core, an overhanging lip on each side edge of each groove, at least one pair of windings in each pair of grooves with a portion of each winding disposed in each groove, the opposite end portions of said windings extending across the opposite ends of said rotor to connect the portions in each groove, a centrally disposed channel member extending throughout the length of each groove between said winding portions, each channel member opening outwardly and at opposite ends, a closure plate for each groove, the side edges of each plate being disposed between said lips to retain said windings in said grooves and close the outwardly opening sides of said channels to provide axially extending air passages and axially spaced peripherally extending slots in said plates providing windows to expose portions of said channels and windings to facilitate the flow of air through said channels and windings.

3. A structure as defined in claim 2 in which means is provided for securing said channel members to said core.

4. Rotor structure for dynamo electric machines, said rotor including a core mounted on a shaft, grooves in said core, windings in said grooves with portions of said windings extending across the ends of said rotor and retaining means for said winding portions comprising a strap extending diametrically across each end of said rotor between said winding portions and said core, each strap having a clearance opening for said shaft, the outer ends of each strap being bent inwardly over the winding portions and means for securing the ends of said straps to said core.

References Cited in the file of this patent

UNITED STATES PATENTS

| 896,321 | Reist | Aug. 18, 1908 |
| 2,043,120 | Punga | June 2, 1936 |

FOREIGN PATENTS

| 586,000 | Germany | Oct. 14, 1933 |
| 931,299 | Germany | Aug. 4, 1955 |